United States Patent [19]

Ogawa et al.

[11] Patent Number: 5,016,119
[45] Date of Patent: May 14, 1991

[54] VIDEO SIGNAL REPRODUCING APPARATUS WITH TWO MODES OF KEEPING TRACK OF ADDRESS

[75] Inventors: Tetsuo Ogawa; Takao Abe; Toshiya Asai, all of Kanagawa, Japan

[73] Assignee: Sony Corporation, Kitashinagawa, Japan

[21] Appl. No.: 391,401

[22] Filed: Aug. 8, 1989

Related U.S. Application Data

[63] Continuation of Ser. No. 13,234, Feb. 10, 1987, abandoned.

[51] Int. Cl.$^5$ ............................................. H04N 5/783
[52] U.S. Cl. .................................. 360/10.3; 360/14.3; 360/72.2; 360/74.4
[58] Field of Search .................... 360/10.2, 10.3, 14.3, 360/72.2, 74.4, 49, 33.1

[56] References Cited

U.S. PATENT DOCUMENTS

| | | | |
|---|---|---|---|
| 4,134,130 | 1/1979 | Tachi | 360/14.3 X |
| 4,159,480 | 6/1979 | Tachi | 360/18 X |
| 4,167,028 | 9/1979 | Tobey | 360/14.3 X |
| 4,167,759 | 9/1979 | Tachi | 360/14.3 |
| 4,232,347 | 11/1980 | Tachi | 360/72.2 X |
| 4,300,171 | 11/1981 | Tachi | 360/72.2 X |
| 4,360,843 | 11/1982 | Meneyes et al. | 360/72.2 |
| 4,622,600 | 11/1986 | Okamoto et al. | 360/32 |
| 4,751,589 | 6/1988 | Kominami et al. | 360/10.3 |
| 4,809,118 | 2/1989 | Nakagawa et al. | 360/33.1 |

*Primary Examiner*—Roy N. Envall, Jr.
*Assistant Examiner*—W. R. Young
*Attorney, Agent, or Firm*—Lewis H. Eslinger

[57] ABSTRACT

In an apparatus for use with a video tape having a longitudinal track in which an address signal is recorded and successive slant tracks in which a video signal and an information signal are recorded at predetermined intervals; a magnetic head unit reproduces the video signal, the information signal, and the address signal. The information signal is applied to a pulse generator for generating a control pulse signal, and an address indication circuit provides an address indication in response to the address signal or the control pulse signal. A control circuit is provided for coupling one or the other of the address signal and the control pulse signal to the address indication circuit selectively in response to the speed of movement of the tape.

9 Claims, 2 Drawing Sheets

VIDEO SIGNAL REPRODUCING APPARATUS WITH TWO MODES OF KEEPING TRACK OF ADDRESS

This is a continuation of application Ser. No. 07/013,234 filed Feb. 10, 1987, now abandoned.

BACKGROUND OF THE INVENTION

1. Field of the Invention

This invention relates to a video signal reproducing apparatus and, more particularly, to a video signal reproducing apparatus for use with a video tape having a longitudinal track having an address signal recorded thereon and successive slant tracks having a video signal recorded thereon and an information signal recorded thereon at predetermined intervals.

2. Description of the Prior Art

In editing a video signal recorded on a video tape, it is important to achieve time related information specifying the distance of movement of the video tape. It is the conventional practice to provide such time related information by employing a time code signal recorded on a longitudinal time code track (LTC). Although this approach is satisfactory when video signal reproduction is performed in a normal mode, it fails to provide any reliable time code signal when the video signal reproduction is performed in a slow mode where the tape speed is too slow to reproduce a reliable time code signal. In fact, any reliable time code signal cannot be obtained when the tape speed is one-fifth or one-tenth of the normal speed at which the video tape moves in a recording mode.

In order to avoid the problem, one approach employs a control signal recorded on another longitudinal time control track (TRC) at predetermined intervals, for example, of one field to update the time related information specified by the last time code signal obtained when the time code signal is still reliable. With this approach, however, the control signal itself becomes too unreliable to update the time related information correctly according to the distance of movement of the video tape when video signal reproduction is performed in a slow mode.

Another approach employs a signal produced at predetermined intervals of the distance of movement of the video tape from a timer roller having a video tape wound therearound at an angle, for example, greater than 180° C. However, this approach creates other problems. First, it requires a space consuming timer roller, resulting in a large-sized apparatus. Second, the timer roller rotates in a frictional manner with respect to the video tape and damages the video tape. In addition, a slippage would occur between the timer roller and the video tape, resulting in an error between the number of rotation of the timer roller and the distance of movement of the video tape to cause inaccurate time related information.

It may also be considered to employ a time code signal recorded on one of the user's bits of each slant video track (TRV). However, this approach reduces the number of the user's bits alloted to users.

OBJECT AND SUMMARY OF THE INVENTION

Therefore, it is a main object of the invention to provide a video signal reproducing apparatus which can provide a reliable time code signal even during a slow reproduction mode without any additional mechanical part.

There is provided, in accordance with the invention, an apparatus for use with a video tape having a longitudinal track having an address signal recorded thereon, and successive slant tracks having a video signal recorded thereon and an information signal recorded thereon at predetermined intervals. The apparatus includes means for reproducing the video signal, the information signal, and the address signal, means responsive to the information signal for generating a control pulse signal, and address indication means alternatively responsive to the address signal or the control pulse signal for providing an address indication. The apparatus also includes control means responsive to the speed of movement of the video tape for coupling one of the address signal and the control pulse signal selectively to the address indication means.

BRIEF DESCRIPTION OF THE DRAWINGS

The invention will be described in greater detail by reference to the following description taken in connection with the accompanying drawings, in which.

DETAILED DESCRIPTION OF THE INVENTION

Figure 1:
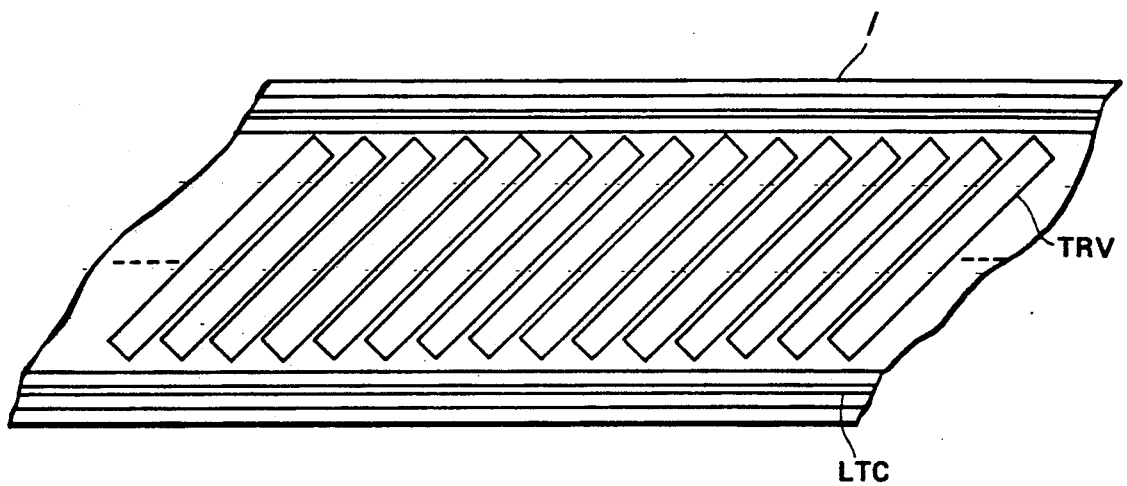
FIG. 1 is a diagram showing a tape format of a video tape used in the inventive apparatus.

Referring to the drawings and more particularly to FIG. 1, there is illustrated a tape format of a digital video tape 1 used with the inventive apparatus. The video tape 1 is shown as having a longitudinal track LTC extending in the longitudinal direction of the video tape 1 and successive slant tracks TRV extending obliquely at the same angle with respect to the longitudinal direction of the video tape 1. The longitudinal track LTC has a time code signal that has been recorded thereon after bi-phase modulation. The slant tracks TRV have a video signal recorded thereon. One field video signals are recorded in sections on a plurality of slant tracks.

Figure 2:
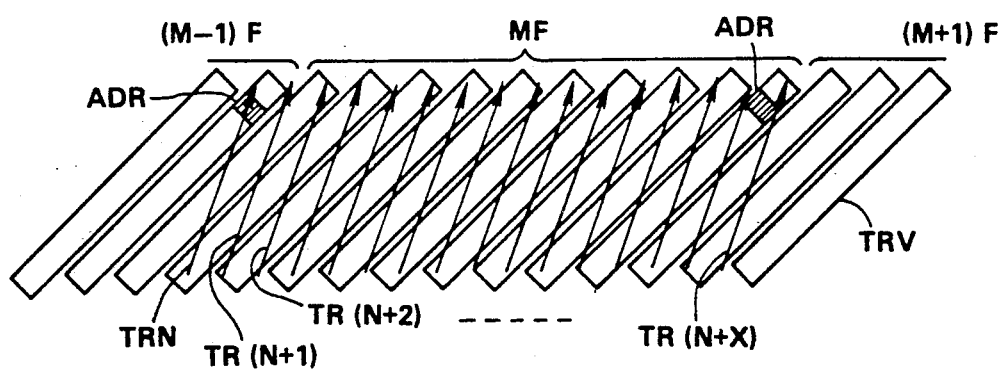
FIG. 2 is a diagram showing a detailed tape format of the video tape.

Referring to FIG. 2, which illustrates the tape pattern in greater detail, the character MF designates one field section including a plurality of (for example, 10 or 12) slant tracks TRN to TR(N+X) on which a magnetic head is scanning to reproduce the one field video signals. The arrows indicate traces of scanning of the magnetic head. Each of the slant tracks has a plurality of data blocks having various kinds of signals recorded thereon, the signals including a track code signal which indicates where the slant track is from the first in the field section, a block index signal which indicates where the data block is from the first in the track, and a field index signal which returns to its initial stage each time four field sections are reproduced. The field index signal changes to 0,1,2 and 3 in this order each time reproduction advances from one field to another field. In addition, an address code area ADR is provided near the trailing edge of the last one of the slant tracks of each field section. In order to reproduce the data, which are recorded in sections in view of data drop-out considerations, in a predetermined order, an address code is provided for each data block.

Figure 3:
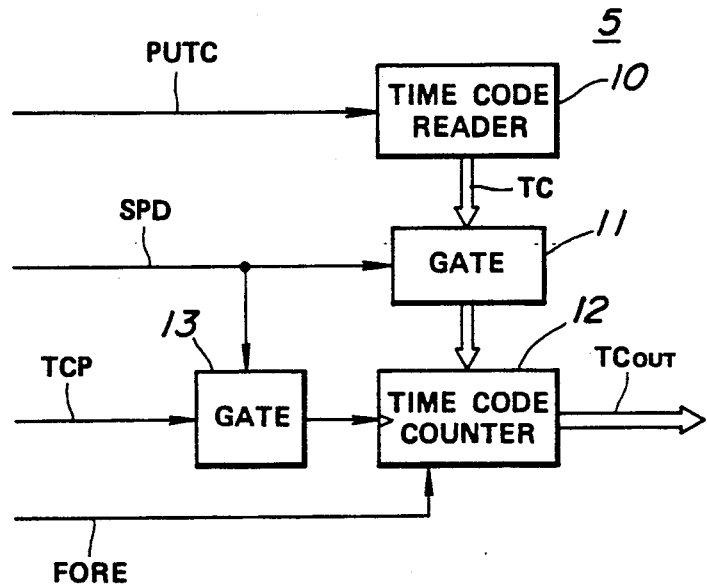
FIG. 3 is a block diagram showing an output stage embodying the invention.

Referring to FIG. 3, there is illustrated a schematic block diagram of a time code signal output stage. The time code signal output stage, generally designated by the numeral 5, includes a time code reader 10. The time code reader 10 receives a pickup signal PUTC fed from a magnetic head and reproduces a time code signal TC which has been recorded on the longitudinal time code track LTC. This operation is performed in accordance with a clock signal extracted from the pickup signal PUTC. The time code signal TC is applied through a gate circuit 11 to the load terminal of a time code counter 12 which has a clock terminal coupled through a second gate circuit 13 to a time control pulse signal TCP fed from a memory switching control circuit 31 (FIG. 4) and an up-down terminal coupled to a forward/reverse signal FORE that represents the direction of running of the video tape 1.

A tape speed signal SPD is applied to the first gate circuit 11 and also to the second gate circuit 13. The tape speed signal SPD is a one-bit signal representative of the result of a determination as to whether or not the speed of movement of the video tape 1 is smaller than a predetermined value which may correspond to the minimum tape speed above which the time code signal TC can be read reliably. For example, the predetermined tape speed may be set at one-fourth of the normal tape speed used in a recording mode. The first gate circuit 11 opens to communicate the time code signal TC to the time code counter 12 only when the tape speed exceeds the predetermined value. The second gate circuit 13 opens to communicate the time control pulse signal TCP to the time code counter 12 only when the tape speed is smaller than the predetermined value.

Figure 4:
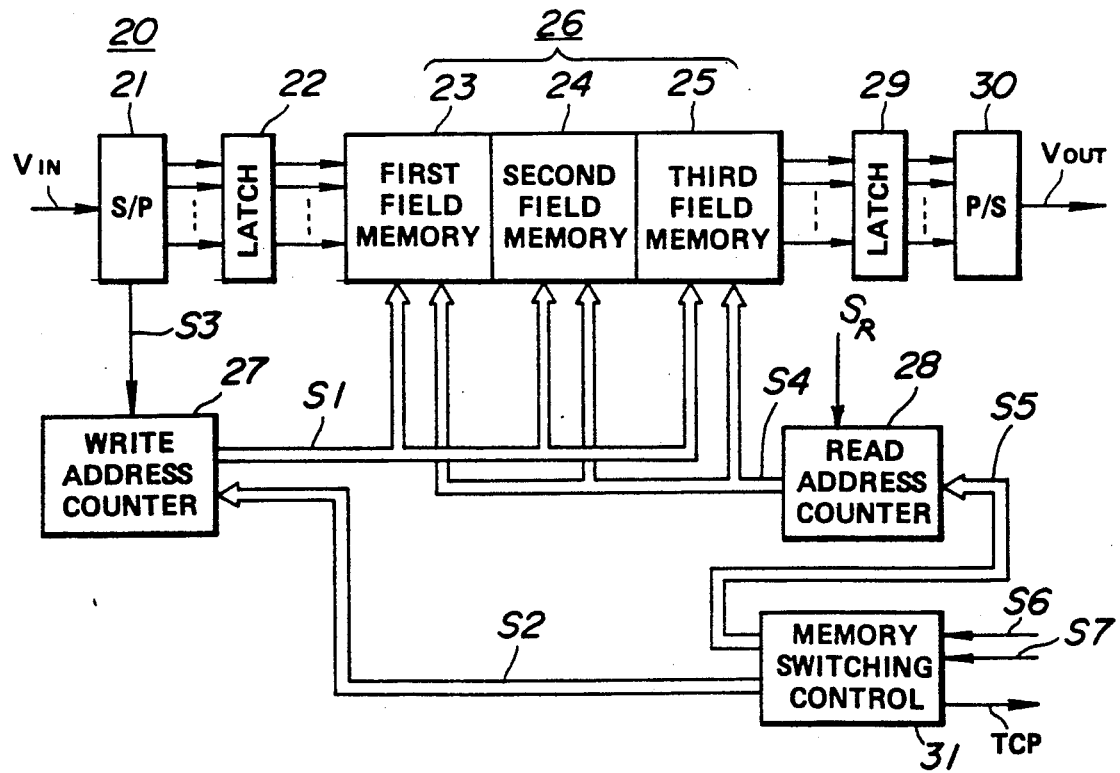
FIG. 4 is a block diagram showing a video signal reproducing stage associated with the output stage.

Referring to FIG. 4, there is illustrated a video signal reproducing stage. The video signal reproducing stage, generally designated by the numeral 20, includes a series-parallel converter 21 which receives a reproduced video signal Vin and converts it into a corresponding parallel data signal. The output of the series-parallel converter 21 is coupled through a latch circuit 22 to a video signal memory 26 which is shown as comprising three field memories 23,24 and 25. Two of the field memories 23,24 and 25 are required to operate in a data writing mode where a reproduced video signal is written thereon since, in a slow reproduction mode, the magnetic head scanning traces, indicated by arrows TRN to TR(N+X) in FIG. 2, rise with respect to the video tracks TRV so that some magnetic head scanning traces extend over two field sections MF and (M+1)F. The other field memory is required to operate in a data reading mode where the written data are read therefrom during the data writing mode of the two field memories.

The first, second and third field memories 23,24 and 25 operate under the control of a memory control unit including a write address counter 27, a read address counter 28, and a memory switching control circuit 31. The memory switching control circuit 31 receives a reproduction information signal S6 recorded on the video tape 1 and a reproduction mode selection information signal S7 provided through a control panel. For example, the reproduction information signal S6 may be an address code signal recorded on an address code area provided near the trailing edge of the last slant track of each field section. The memory switching control circuit 31 produces an address load signal S2 to the write address counter 27, an address load signal S5 to the read address counter 28, and a time code control pulse signal TCP to the gate circuit 13 (FIG. 3) each time it receives an address code signal as the signal S6, that is, when reproduction of one-field video signals is completed. The address load signal S2 has an address indication which specifies a memory area on which the video signal is to be written. The address load signal S5 has an address indication which specifies a memory area from which the written video signal is to be read.

The write address counter 27 receives the address load signal S2 fed from the memory switching control circuit 31 and starts counting reproduction clock pulses S3 from a count corresponding to the address loaded by the address load signal S2. The write address counter 27 produces a write address signal S1 to the video signal memory 26 so as to write video data on a memory area having an address specified by the write address signal S1.

The read address counter 28 receives the address load signal S5 from from the memory switching control circuit 31 and starts counting standard frequency reference clock pulses SR from a count corresponding to the address loaded by the address load signal S5. The read address counter 28 produces a read address signal S4 to the video signal memory 26 so as to read video data out of a memory area having an address specifed by the read address signal S4.

The video data read from the video signal memory 26 are fed through a latch circuit 29 to a parallel-series converter 30 which converts it into a corresponding series signal Vout.

The operation is as follows. Assuming first that the video signal is reproduced in a normal reproduction mode where the video tape 1 moves at such a normal speed as to permit reliable reading of the time code signal TC recorded on the time code track LTC, the tape speed signal SPD has a value representing the tape speed exceeding a predetermined value. As a result, the gate circuit 11 opens to communicate the time code signal TC to the load terminal of the time code counter 12, whereas the gate circuit 13 closes to interrupt the time control pulse signal TCP to the time code counter 12. Consequently, the time code counter 12 updates its count to a value corresponding to the address loaded by the time code signal TC each time a time code signal is applied thereto. Therefore, the time code counter 12 produces an output signal TCout which is substantially the same as the inputted tie code signal TC.

When the video signal reproducing operation is changed from the normal mode into a slow mode where the video tape 1 travels at such a low speed as to render reliable reading of the time code signal TC difficult, the tape speed signal SPD changes to a value representing the tape speed being less than the predetermined value. As a result, the gate circuit 11 closes to interrupt the time code signal TC to the time code counter 12, whereas the gate circuit 13 opens to communicate the time control pulse signal TCP to the clock terminal of the time code counter 12. At this time, the time code counter 12 has a count corresponding to the address loaded by the last time code signal fed from the time code reader 10. Consequently, the time code counter 12 starts counting the time control pulses TCP from a count corresponding to the address loaded by the last time code signal. The time code counter 12 responds to the forward/reverse signal FORE and counts the time control pulses upward when the video tape 1 travels in the forward direction and downward when the video tape 1 travels in the reverse direction. The time code counter 12 produces an output signal TCout corresponding to the count of the time code counter 12.

It is therefore apparent that there has been provided, in accordance with this invention, a video signal reproducing apparatus for providing a reliable time related information even during a slow reproduction mode that fully satisfies the objects, aims and advantages set forth above. While this invention has been described in conjunction with a specific embodiment thereof, it is evident that many alternatives, modifications and variations will be apparent to those skilled in the art. Accordingly, it is intended to embrace all alternatives, modifications and variations that fall within the scope of the appended claims.

What is claimed is:

1. Apparatus for use with a video tape having a longitudinal track in which an address signal is recorded and successive slant tracks in which a video signal and an information signal are respectively recorded at predetermined locations, said apparatus comprising:
   means for reproducing said video signal, said information signal, and said address signal;
   means responsive to the reproduced information signal for generating a control pulse signal;
   address indication means responsive alternatively to said address signal recorded on said longitudinal track and said control pulse signal for providing an address indication; and
   control means responsive to the speed of movement of said tape for selectively coupling one of said address signal and said control pulse signal to said address indication means;
   wherein said address indication means includes a counter responsive to said address signal for accumulating a count corresponding to a value loaded by said address signal and responsive to said control pulse signal for updating said count, thereby accumulating a count corresponding to said address indication.

2. The apparatus as in claim 1, wherein said information signal is a field index signal recorded on one of a predetermined number of said slant tracks on which one field of the video signal is recorded.

3. The apparatus as in claim 1, wherein said information signal is an address code signal reproduced upon completion of the reproduction of one field of the video signal.

4. The apparatus as in claim 1, wherein said slant tracks are grouped into data blocks respectively corresponding to successive fields of said video signal, and said information signal is a block index signal recorded on each of said data blocks.

5. The apparatus as in claim 1, wherein said information signal is a track code signal recorded on selected ones of said slant tracks.

6. The apparatus as in claim 1, wherein said control means couples said address signal to said address indication means when the speed of movement of said tape exceeds a predetermined value which is less than a normal recording speed, and said control means couples said control pulse signal to said address indication means when the speed of movement of said tape is less than said predetermined value.

7. The apparatus as in claim 6, wherein said predetermined value is one-fourth of a normal recording speed.

8. The apparatus as in claim 1, wherein said address indication means provides a continuous address indication.

9. The apparatus as in claim 1, wherein said counter includes means responsive to the direction of movement of said tape for counting said control pulse signal upward when the tape travels in a forward direction and downward when the tape travels in a reverse direction.

* * * * *